United States Patent
Harms et al.

(10) Patent No.: US 6,865,459 B2
(45) Date of Patent: Mar. 8, 2005

(54) ELECTRONIC SYSTEM FOR A VEHICLE AND SYSTEM LAYER FOR OPERATIONAL FUNCTIONS

(75) Inventors: Klaus Harms, Vaihingen (DE); Rainer Kallenbach, Waiblingen (DE); Wolfgang Hermsen, Kirchheim (DE); Werner Folkendt, Bietigheim-Bissingen (DE); Thomas Schuster, Brackenheim (DE); Werner Kind, Markgroeningen (DE); Holger Huelser, Graz (AT); Reiner Folke, Kornwestheim (DE); Rasmus Frei, Stuttgart (DE); Rainer Mayer, Weil der Stadt (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/129,683

(22) PCT Filed: Aug. 31, 2001

(86) PCT No.: PCT/DE01/03360

§ 371 (c)(1),
(2), (4) Date: Sep. 26, 2002

(87) PCT Pub. No.: WO02/22401

PCT Pub. Date: Mar. 21, 2002

(65) Prior Publication Data

US 2003/0078699 A1 Apr. 24, 2003

(30) Foreign Application Priority Data

Sep. 7, 2000 (DE) .......................... 100 44 319

(51) Int. Cl.⁷ .............................. G06F 7/00; G06F 19/00

(52) U.S. Cl. ............................ 701/36; 701/37; 701/41; 701/45; 701/49; 701/48; 701/70; 180/170

(58) Field of Search ........................... 70/1, 36, 37, 41, 70/45, 49, 48, 70; 180/170, 268

(56) References Cited

U.S. PATENT DOCUMENTS

| 5,351,776 A | 10/1994 | Rolf et al. ................. 180/79.1 |
| 6,192,857 B1 * | 2/2001 | Shimada ..................... 123/322 |
| 6,273,204 B1 * | 8/2001 | Winner et al. .............. 180/170 |

(List continued on next page.)

FOREIGN PATENT DOCUMENTS

| DE | 41 11 023 | 4/1994 |
| DE | 197 09 319 | 9/1998 |
| DE | 198 57 916 | 6/2000 |
| DE | 195 00 957 | 7/2001 |
| WO | 00 09376 | 2/2000 |

OTHER PUBLICATIONS

Geretschlaeger, P. et al, "Objektorientierte Entwicklung eingebetteter Echzeitsysteme in Automobil," May 28, 1999, url:http://ist.unibw-muenchen.de/GROOM/OMER/™final/geretschlaeger.pdf**.

(List continued on next page.)

*Primary Examiner*—Thomas G. Black
*Assistant Examiner*—Ronnie Mancho
(74) *Attorney, Agent, or Firm*—Kenyon & Kenyon

(57) ABSTRACT

An electronic system for a vehicle includes first components for carrying out control tasks in response to operating sequences and second components that coordinate a cooperation of the components for carrying out control tasks. The first components carry out the control tasks by using operating functions and basis functions, wherein the system is constructed such that the basis functions are combined in a basis layer, and a system layer is superimposed on the basis functions, which includes at least two of the second components. At least one open interface of the system layer is provided for the operating functions, and the system layer links the basis functions to any and all operating functions, such that the operating functions can be interconnected and/or used in a modular fashion.

9 Claims, 3 Drawing Sheets

U.S. PATENT DOCUMENTS

| | | | |
|---|---|---|---|
| 6,292,741 B1 * | 9/2001 | Bitzer et al. | 701/115 |
| 6,339,739 B1 * | 1/2002 | Folke et al. | 701/70 |
| 6,360,152 B1 * | 3/2002 | Ishibashi et al. | 701/48 |
| 2001/0054847 A1 * | 12/2001 | Yoshida et al. | 307/10.1 |

OTHER PUBLICATIONS

Paccard E., "Technology for a new automotive era," Jul., 1999, Real–time Magazine, pp. 20–24**.

SAE Paper 980200 "CARTRONIC—an open architecture for networking the control systems of an automobile," Feb. 23, 1998.

Osek/VDX—Binding Specification, Version 1.0—Jul. 28, 2000*.

* cited by examiner

ELECTRONIC SYSTEM FOR A VEHICLE AND SYSTEM LAYER FOR OPERATIONAL FUNCTIONS

FIELD OF THE INVENTION

The present invention relates to an electronic system for a vehicle and a system layer of the electronic system for operating functions.

BACKGROUND INFORMATION

The number of electronic systems in vehicles is continually increasing. Sequential introduction of additional new electronic vehicle systems is foreseeable. Because the effects of the individual systems are not independent of each other, significant additional uses can be derived from synergies obtainable by interconnection of the various electronic systems in the vehicle. A technical foundation for overcoming complexity in the implementation of system interconnection in electronic vehicle systems is presented in the SAE paper 980200 "CARTRONIC—an Open Architecture for Networking the Control Systems of an Automobile," presented at the International Congress in Detroit, Mich., on Feb. 23, 1998. The paper presents an open control architecture for the entire vehicle. It is possible to implement this control architecture in an electronic driver-vehicle system composed of components for carrying out control tasks in the vehicle, as is described in German Patent Application No. 41 11 023 (corresponding to U.S. Pat. No. 5,351,776). In this context, the control tasks relate to the vehicle motion and/or the drive train, and the components included coordinate the cooperation of the components for the control tasks. The components are arranged in a plurality of levels in a hierarchy, in accordance with the vehicle topology. At least one coordination component of a hierarchy level acts upon the components of the next hierarchy layer, and therefore, upon a subsystem of the driver-vehicle system, in response to converting the driver's input request into a corresponding operational performance, making available for the subsystem the performance used by the higher hierarchy-level. The coordination components are distinguished for the entire vehicle, the drive train, and the motion of the vehicle, with each of the subsystems coordinating its own subsystems.

In general, a system of the type described above is superimposed on a general, i.e., standardized, real-time operating system. A standard operating system of this type is, for example, ERCOS or OSEK, i.e., OSEK/VDX. OSEK/VDX, which is described in the Binding Specification, Version 1.0 dated Jul. 28, 2000. This open system, along with its interfaces for the electronics in the vehicle, forms the basis for the superimposed system. A comparable real-time operating system, as is described above, is ERCOS, which is described in German Patent Application No. 195 00 957.

Heretofore, it has been customary to employ embedded software solutions for controlling the operating sequences of a vehicle, superimposing them on the real-time operating system.

In this context, applications-specific functions, basic system functions, core functions, as well as the corresponding driver software, i.e., the specific basis functions, interact with both the different operating functions and with the partial operating functionalities, which determine the actual operating performance of the vehicle. Changes in functions or the subsequent addition of functions caused by software solutions that are interconnected in this manner, permit very complex system configurations to arise, especially with regard to the interfaces.

The addition of new functions in such systems is optimized in accordance with the present invention.

SUMMARY

The prerequisites afforded by the system concept in the SAE paper 980200 are optimized according to the present invention by the clear separation of operating and basis functions and by the introduction of a system layer having an open interface function.

The present invention may be applied in an electronic system for a vehicle, i.e., on a system layer of the electronic system, the electronic system including first components for carrying out control tasks in response to the operational sequences of the vehicle and second components, which coordinate the cooperation among the first components for carrying out the control tasks. In this context, the first components carry out the control tasks by applying operating functions and basis functions.

The system is constructed such that basis functions and operating functions, i.e., partial operating functionalities (hereinafter: partial operating modules), are clearly separated from each other, the basis functions being combined in a basis layer. Advantageously, the system layer is then superimposed on the basis layer, which contains the basis functions. In this context, the system layer contains at least two of the second components, which coordinate the cooperation of the control components. In response to the system layer, at least one open interface to the operating functions is provided, the system layer connecting the basis functions to all of the operating functions so that the operating functions can be interconnected and/or used in a modular fashion, i.e., can be connected to the electronic system in a modular fashion.

Therefore, the operating functions, i.e., the partial operating modules, can advantageously be connected to the electronic system, such that they can be reused and at any time replaced, i.e., changed.

It is also advantageous that, as a result, a well-defined interface is established by the system layer that makes it possible, in the context of the control unit software for the operating functions, to create variants, as well as to expand or change functionality, especially using partial operating modules, so-called plug-ins.

In one configuration, it is possible to further develop, change at any time by adding new operating functions to expand a system which is already in use or operation.

Thus, it is possible to design, develop, or implement, control tasks, including specific performance features, of an electronic system in a very flexible and individualized manner.

Advantageously, monitoring functions with regard to the operating functions and/or the partial operating modules are additionally linked to the system layer.

As a result, the advantages of modulizing the software and the monitoring functionalities are obtained, and also the possibility of linking, for example, software generated by third parties to the electronic system at insignificant expense. This advantageously also makes it possible, in particular, to depict customer-specific variants exclusively within the operating functions, i.e., the partial operating modules, while the system layer can be configured independently of the application.

Advantageously, the system layer of the second components includes at least those handling the coordination of the entire vehicle and the coordination of the drive train, and/or the coordination of the motion of the vehicle.

The partial operating modules can advantageously be linked and/or used in a modular fashion before or during a compilation and before or during the performance of the control tasks.

DETAILED DESCRIPTION

Figure 1:
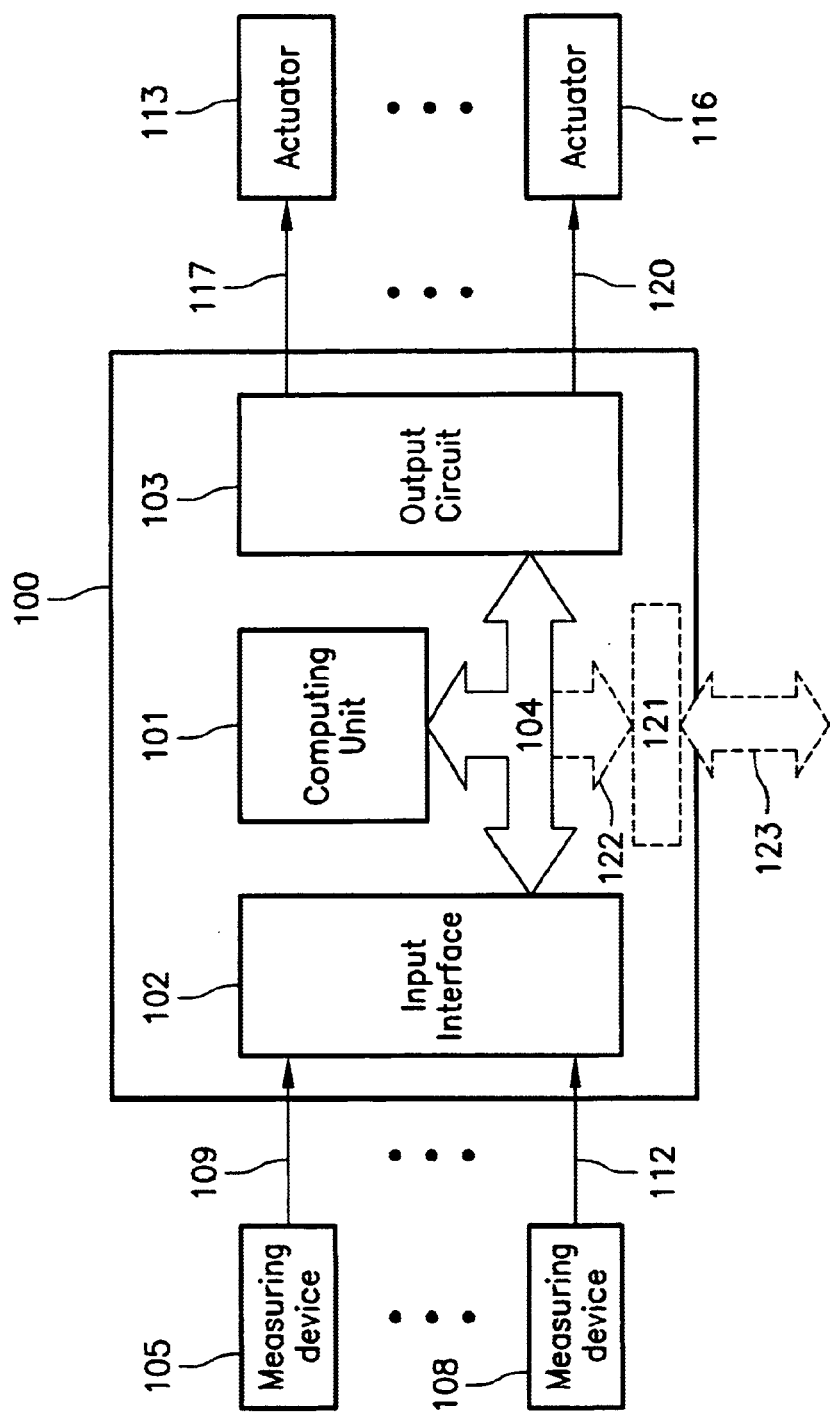
FIG. 1 depicts a general circuit diagram of a control device according to an embodiment of the present invention.

FIG. 1 depicts a block diagram of a control device for carrying out control tasks in the context of the operating sequences in a vehicle. The control device, for executing control tasks is connected to the operating sequences of the vehicle in the context of engine control (gasoline, diesel, BDE, etc.), braking, i.e., driving function control (ABS, ASR, ESP, brake by wire, etc.), transmission control, control for the electrical power assisted steering (e.g., steer by wire), as well as control for systems of vehicle guidance and/or outward visibility (e.g., ACC), body control (e.g., door lock, window opener, etc.), power, i.e., on-board electrical, control, etc.

A control unit 100 includes an input circuit, i.e., input interface 102, at least one computing unit 101, and one output interface 103. A communications system 104, in particular a bus system, connects these components for reciprocal data exchange. Leading to input circuit 102 of control unit 100 are input lines 109 through 112, which in one exemplary embodiment are executed as a bus system and over which signals are conveyed to control unit 100, which represent operating quantities to be evaluated for carrying out the control tasks. These signals are measured by measuring devices 105 through 108 and are supplied by other control devices (not shown). Performance quantities of this type are, for example, accelerator pedal position, engine rotational speed, engine load, exhaust gas composition, engine temperature, transmission ratio, driving speed, wheel rotational speed, steering angle, rate of rotation (gear torque), distance from vehicle ahead or obstacle, etc. Via output circuit 103, control unit 103 controls, or regulates, actuators 113 through 116 over lines 117 through 120, in accordance with the specific application of the control device.

For control, for example, of a drive unit, the performance of the drive unit is regulated, e.g., via output circuit 103. Via output lines 117 through 120, the quantity of fuel to be injected, the injection or ignition angle of the internal combustion engine, as well as the position of at least one electrically actuated throttle valve for adjusting the air intake to the internal combustion engine are set. Output lines 117 through 120 may also be configured as a bus system.

In this context, symbolically depicted by elements 121, 122, and 123, it is also optionally possible to represent an individual input/output switching circuit 121, in particular a bus controller having a connection 122 to communication system 104 and having an external connection 123 to actuators, further control units, or sensors.

In addition to the corresponding measuring systems depicted that supply the input quantities, further control devices of the vehicle, i.e., of the vehicle systems, are provided, which convey to input circuit 102, or optionally to bus coupling circuit 121, further input quantities, for example, setpoint inputs, in particular, rotational torque setpoint values. Corresponding control systems, which deliver input quantities of this type include control devices that direct anti-spin regulation, driving dynamics regulation, transmission control, engine drag torque regulation, velocity regulator, velocity limiter, vehicle guidance regulator, etc.

In internal combustion engine control, the air intake to the internal combustion engine is set via the depicted adjustment paths, whereas in a spark ignition engine, the ignition angle of the individual cylinders, the fuel quantity to be injected, the injection time point and/or the air/fuel ratio, etc., are set. In addition to the depicted setpoint inputs, the external setpoint inputs which include a setpoint input via the driver in the form of a driver input and a maximum velocity limitation, internal input quantities are also included for controlling the drive unit, such as a rotational torque change in an idle regulation, a rotational speed limitation which produces a corresponding input quantity, a torque limitation, etc.

FIG. 1 indicates the various regulating and control tasks that exist in a motor vehicle and the control systems, or control devices, that are linked or interconnected as first components. As a result of an coordination of these control tasks, or of the first components carrying them out, the result in accordance with the present invention is a more powerful, i.e., more optimized, system-oriented performance. An example of such optimized performance is the control and regulation of the complete drive train, taking into account all of the coordination components (e.g., overall vehicle, motion of the vehicle, drive train), instead of individual actions of engine and transmission using reciprocal data exchange. As a result, the possibility arises for the system layer to make changes and improvements in operating functions, in particular in, or through, partial operating modules, so-called plug-ins. Partial operating modules vary and/or expand already existing operating functions without changing the actual core functionality of the operating function. They therefore represent a simple means of modification. In the meaning of the present invention, which refers to vehicle-relevant functions that are encapsulated, portable, and capable of being transmitted and reused, in order to be able to uniformly apply them in a modular fashion, e.g., for different control components, the operating functions and the partial operating modules can be uniformly employed and can be superimposed on the system layer.

Figure 2:
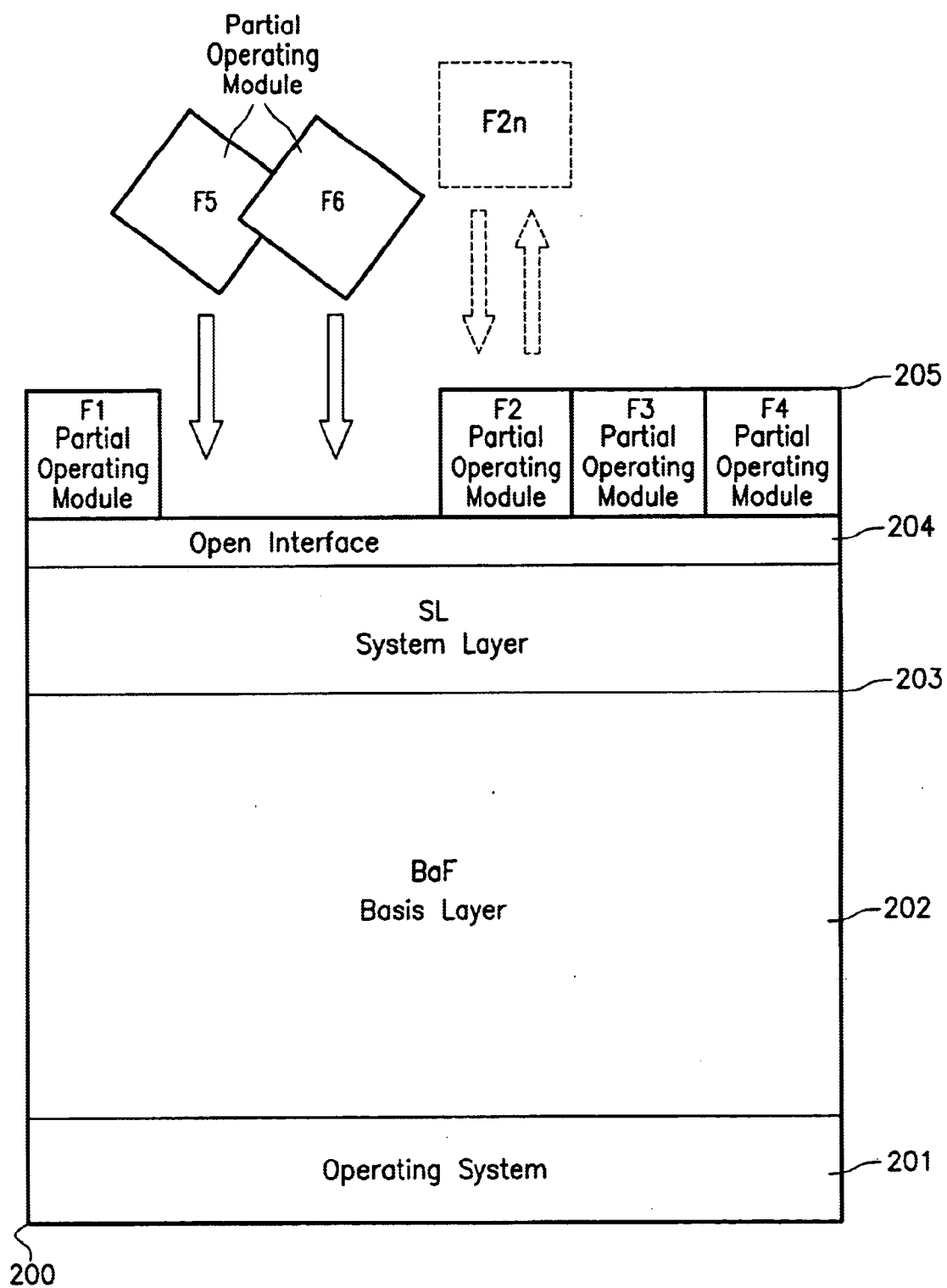
FIG. 2 depicts an electronic system configured as a software architecture to be transported onto the electronics of the vehicle according to an embodiment of the present invention.

In FIG. 2, electronic system 200 is depicted, which can be realized, for example, by implementing a software architecture on the electronic hardware corresponding to the vehicle topology. The basic connection to the hardware of the vehicle is supplied by layer 201, which symbolizes the standard operating system, i.e., OSEK, or ERCOS.

According to the present invention, a separation is now carried out between basis functions, i.e. basis functionality, and operating functions, i.e., the corresponding functionality.

Basis functions BaF are superimposed in a basis layer 202 on real-time operating system 201. Basis functions of this type are, for example, system core functions (core functions), driver software and basic system functionalities, i.e., functions that are specific to the control device, i.e., the control unit. Onto these basis functions BaF, i.e., basic functions, system layer 203 is then superimposed, which contains an open interface 204, i.e., is in connection via the latter with the operating function layer, i.e., partial operating module layer 205. In contrast, to complete operating functions, the partial operating modules, as already mentioned, are conceived so that they can vary the already existing functionality or can expand the functionality of the lower layers. However, when partial operating modules (plug-ins) are added or replaced, the core functionality is not changed.

In an exemplary embodiment, interfaces are made available for the partial operating modules in operating functions which, on the one hand, make available for the system layer the interface of the plug-in functionality and which, on the other hand, represent to the outside the interface to the plug-ins. This interface functionality can be represented in a plug-in-interface component in the system layer, which is then subject to necessary adjustments in the event of the replacement of a plug-in.

Operating functions, i.e., partial operating modules F1 through F4, in this context, are realized via the open interface, in which the aforementioned interface components can be contained. Therefore, it is possible to simply link further operating functions, i.e., partial operating modules F5 and F6 superimposed on open interface 204, i.e., to link them to electronic system 200. In addition, changes of existing functionality F2, as indicated, can easily be made by removal and by changing to a new F2 operating function and by a renewed addition to open interface 204. In this manner, these vehicle functions, i.e., operating functions, can very easily be designed in a driver-specific, i.e., in a vehicle-specific manner, and at the same time in a modular and reusable manner. Similarly, they can always be interconnected and/or linked with respect to a compilation, and for carrying the control tasks. Thus, connecting the functionality in addition to the application is easily accomplished during operation.

In system layer SL, i.e., 203, function interfaces with regard to operating functions, i.e., partial operating modules, as well as coordination components are stored. These are depicted in FIG. 2 in open interface 204.

At the same time, monitoring functions may be implemented for the functionalities of the partial operating modules in system layer SL 203. These monitoring functions then individually monitor the plausibility of the input information supplied to the partial operating modules, the plausibility of the output information supplied by them, as well as the presence and the correct functioning of the functionalities represented by the partial operating modules.

Figure 3:
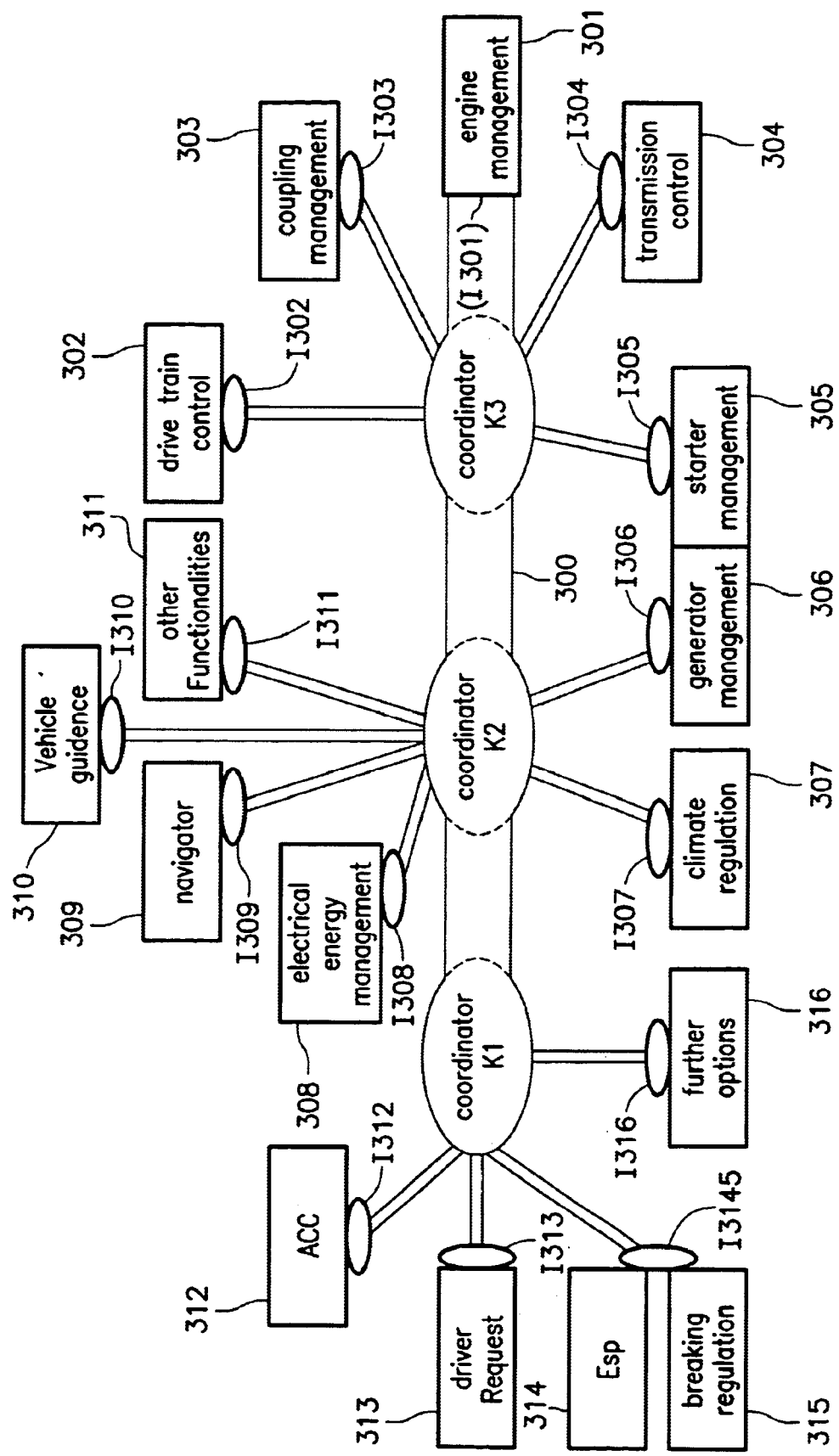
FIG. 3 depicts an exemplary embodiment of the electronic system in the context of a drive train management system.

A specific embodiment of drive train management is illustrated in greater detail in FIG. 3. The specific functionality, can be distributed in any manner over the electronics contained in the vehicle. In this context, FIG. 3 shows the unification of coordinators K1, K2, and K3, K1 designating the vehicle motion coordinator, K2 designating the overall vehicle coordinator, and K3 designating the drive train coordinator, in system layer 203. This unification of coordinators in one layer is represented here as 300, since in this context the monitoring functions are not depicted. Engine management 301 is coupled via an interface I301. Engine management 301 is depicted, for example, in German Patent Application 100 166 45. In response to a division into engine-dependent and engine-independent functionalities, it is possible to classify the motor-dependent functions as basic functions, as a result of which the motor-independent, superordinate driving functions do not have to take into consideration the engine-specific selection of the adjustment path for realizing their requests. If a different division is undertaken with regard to the basic functions, then I301 is provided as standard interface, and the engine management can be implemented in the area of plug-in functionality.

The implementation of a drive train management of this type is accomplished first in a decentralized hardware architecture in the pre-existing control devices of the drive train. However, this function and software architecture also supports a distribution of the functions to other computers, i.e., computer units, i.e., control devices in the vehicle. Interfaces I302 through I313 as well as I3145 and I316, in this context, can be unified in accordance with the present invention in open interface layer 204 from FIG. 2. The coordinators for vehicle motion K1, entire vehicle K2, and drive train K3 are contained in system layer SL. As a result of the aforementioned open standard interfaces, functions using the system layer of the control units, i.e., control-device-specific functions, can be superimposed in a simple manner on basis functions BaF. Operating functions of this type relate to, for example, mechanical, thermal, and/or electrical energy management 308, navigation 309, vehicle guidance 310, climate regulation 307, and generator management 306, as well as other functionalities coordinated via coordinator K2, represented by functionalities element 311. The same applies with respect to drive train coordinator K3 for coordinated drive train control 302, coupling management 303, transmission control 304, and starter management 305. Provided here with respect to vehicle motion coordinator K1 are ACC (Adaptive Cruise Control) 312, driver request 313, ESP 314, braking regulation 315, and element 316 representing further options. In this context, ESP 314 and braking regulation 315 are received by, e.g., a common interface I3145. Similarly, operating functions can have interconnections among themselves, as is the case in starter management 305 and generator management 306.

The present invention therefore makes possible an optimized modular conversion of existing and new vehicle functions. The resulting implementation according to the present invention produces an open and modular electronic system for the vehicle, which assures long-term expandability also with respect to new electronic vehicle systems and partial vehicle systems.

What is claimed is:

1. An electronic system for a vehicle comprising:

first components for carrying out control tasks through use of operating functions and basis functions in response to operating sequences;

second components coordinating a cooperation of the first components for carrying out the control tasks;

a basis layer containing the basis functions;

a system layer superimposed on the basis layer including at least two of the second components; and at least one open interface between the system layer and the operating functions;

wherein the system layer links the basis functions to the operating functions such that the operating functions can be interconnected and used in a modular fashion.

2. The electronic system of claim 1, wherein functions that monitor the operating functions are additionally interconnected in the system layer.

3. The electronic system of claim 1, wherein the second components include components for regulating control tasks for at least one of an overall vehicle, vehicle motion, and a drive train, the system layer including at least one of components for an overall vehicle, a drive train and vehicle motion.

4. The electronic system of claim 1, wherein the operating functions are interconnected in a modular fashion at least one of:

before a compilation, during a compilation, before execution of the control tasks, and during execution of the control tasks.

5. A system layer of an electronic system of a vehicle comprising:

first components for carrying out control tasks in response to operating sequences of the vehicle, the first components carrying out the control tasks by using operating functions and basis functions; and at least two second components for coordinating a cooperation of the first components for carrying out the control tasks; and at least one open interface;

wherein the system layer links the operating functions to the basis functions via the least one open interface such that the operating functions can be at least one of linked in a modular fashion to the electronic system and interconnected to the electronic system.

6. The system layer of claim 5, wherein the system layer interconnects monitoring functions with the operating functions.

7. The system layer of claim 5, wherein the second components include components that coordinate a cooperation of the first components that control at least one of the overall vehicle, the drive train and vehicle motion.

8. A functional control system for a vehicle comprising:

a real time operating system;

a basis layer containing basis control functions superimposed on the real time operating system; and a system layer superimposed on the basis layer;

an open interface coupled to the system layer; and operating functions that can be added and removed from the open interface in a modular fashion.

9. The functional control system of 8, wherein the basis control functions include system core functions and a driver functions.

* * * * *

UNITED STATES PATENT AND TRADEMARK OFFICE
CERTIFICATE OF CORRECTION

PATENT NO. : 6,865,459 B2
DATED : March 8, 2005
INVENTOR(S) : Klaus Harms et al.

It is certified that error appears in the above-identified patent and that said Letters Patent is hereby corrected as shown below:

<u>Column 1,</u>
Lines 49-50, change "i.e., OSEK/VDX. OSEK/VDX, which is described" to
-- i.e., OSEK/VDX, which is described --

<u>Column 7,</u>
Line 32, change "via the least" to -- via the at least --

Signed and Sealed this

Twelfth Day of July, 2005

JON W. DUDAS
*Director of the United States Patent and Trademark Office*